US011727690B2

(12) United States Patent
Bansal et al.

(10) Patent No.: US 11,727,690 B2
(45) Date of Patent: Aug. 15, 2023

(54) BEHAVIOR PREDICTION OF SURROUNDING AGENTS

(71) Applicant: Waymo LLC, Mountain View, CA (US)

(72) Inventors: Mayank Bansal, Mountain View, CA (US); Dragomir Anguelov, San Francisco, CA (US)

(73) Assignee: Waymo LLC, Mountain View, CA (US)

(*) Notice: Subject to any disclaimer, the term of this patent is extended or adjusted under 35 U.S.C. 154(b) by 427 days.

(21) Appl. No.: 16/839,693

(22) Filed: Apr. 3, 2020

(65) Prior Publication Data

US 2021/0312177 A1 Oct. 7, 2021

(51) Int. Cl.
*B60W 60/00* (2020.01)
*G06V 20/58* (2022.01)
*G06V 20/10* (2022.01)
*G06N 3/045* (2023.01)
*G06N 3/047* (2023.01)
(Continued)

(52) U.S. Cl.
CPC ....... *G06V 20/58* (2022.01); *B60W 60/00259* (2020.02); *B60W 60/00274* (2020.02); *G06N 3/045* (2023.01); *G06N 3/047* (2023.01); *G06V 10/764* (2022.01); *G06V 10/82* (2022.01); *G06V 20/10* (2022.01)

(58) Field of Classification Search
CPC ............ G06V 20/10; B60W 60/00274; B60W 60/00259; G06N 3/0454; G06N 3/0472
USPC ......................................................... 701/45
See application file for complete search history.

(56) References Cited

U.S. PATENT DOCUMENTS

2018/0124423 A1* 5/2018 Choi ...................... H04N 19/52
2019/0176818 A1 6/2019 Movert et al.
(Continued)

FOREIGN PATENT DOCUMENTS

KR 1020190062184 6/2019

OTHER PUBLICATIONS

Kim et al., "Probabilistic Vehicle Trajectory Prediction over Occupancy Grid Map via Recurrent Neural Network," https://arxiv.org/abs/1704.07049v2, last revised Sep. 2017, 6 pages.
(Continued)

*Primary Examiner* — Mahmoud S Ismail
(74) *Attorney, Agent, or Firm* — Fish & Richardson P.C.

(57) ABSTRACT

Methods, systems, and apparatus, including computer programs encoded on computer storage media, for predicting occupancies of agents. One of the methods includes obtaining scene data characterizing a current scene in an environment; and processing a neural network input comprising the scene data using a neural network to generate a neural network output, wherein: the neural network output comprises respective occupancy outputs corresponding to a plurality of agent types at one or more future time points; the occupancy output for each agent type at a first future time point comprises respective occupancy probabilities for a plurality of locations in the environment; and in the occupancy output for each agent type at the first future time point, the respective occupancy probability for each location characterizes a likelihood that an agent of the agent type will occupy the location at the first future time point.

20 Claims, 6 Drawing Sheets

(51) Int. Cl.
*G06V 10/764* (2022.01)
*G06V 10/82* (2022.01)

(56) References Cited

U.S. PATENT DOCUMENTS

2020/0082248 A1\* 3/2020 Villegas ................ B60W 40/02
2020/0086863 A1\* 3/2020 Rosman ................ B60W 30/09
2021/0197813 A1\* 7/2021 Houston .................. G06N 3/08

OTHER PUBLICATIONS

Park et al., "Sequence-to-Sequence Prediction of Vehicle Trajectory via LSTM Encoder-Decoder Architecture," https://arxiv.org/abs/1802.06338v3, last revised Oct. 2018, 7 pages.
International Search Report and Written Opinion in International Appln. No. PCT/US2021/025780, dated Jul. 22, 2021, 11 pages.
Rhinehart et al., "PRECOG: PREdiction Conditioned On Goals in Visual Multi-Agent Settings," Proceedings of the IEEE/CVF International Conference on Computer Vision, 2019, pp. 2821-2830.
International Preliminary Report on Patentability in International Appln. No. PCT/US2021/025780, dated Oct. 13, 2022, 7 pages.

\* cited by examiner

OCCUPANCY OUTPUT 330

BEHAVIOR PREDICTION OF SURROUNDING AGENTS

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make predictions in a production system.

SUMMARY

This specification describes how a system on-board a vehicle, e.g., an autonomous or semi-autonomous vehicle, can generate one or more occupancy outputs using an occupancy prediction system. The system can concurrently generate an occupancy output for each of one or more agent types and each of one or more future time points. The occupancy output for a given agent type and a given future time point characterizes, for each of multiple locations in the environment of the vehicle, a respective predicted likelihood that the location will be occupied by an agent of the given agent type at the given future time point.

The occupancy prediction system can receive as input scene data characterizing a current state of the environment, and process the scene data using a neural network to generate p occupancy outputs each corresponding to one of q agent types and one of r future time points, where generally p=q×r. In some implementations, each of the p occupancy outputs can be generated in parallel, conditioned on a common representation of the input scene data generated by the neural network.

Once the occupancy prediction system has been trained, the trained occupancy prediction system can be deployed on a vehicle and can be used by the vehicle to make autonomous or semi-autonomous driving decisions.

Particular embodiments of the subject matter described in this specification can be implemented so as to realize one or more of the following advantages.

Some existing techniques for generating predicted occupancy outputs rely on predicted future paths of surrounding agents. For a given surrounding agent, a separate prediction system would generate one or more predicted future paths of the agent, each with a respective probability. An occupancy prediction system would then receive these predicted paths and, for each location in the environment, infer an occupancy probability from the predicted paths. In some cases, the predicted future paths are restricted to obey a roadgraph that is provided as input to the system; that is, the system cannot predict that a surrounding agent will navigate outside the boundaries of the roadgraph, e.g., by making an illegal turn or straying into a different lane. These existing techniques have poor results when the predicted paths are inaccurate or unavailable.

These existing techniques further do not directly model the interactions between different surrounding agents, but rather rely on the predicted future paths of single agents in isolation. Using the techniques described in this specification, an occupancy prediction system can learn non-linear features of the surrounding environment, explicitly taking the interactions between one or more surrounding agents and the vehicle into account. Furthermore, the system is not reliant wholly on the roadgraph. Rather, systems described in this specification can generate predictions for surrounding agents that would violate the roadgraph. As a particular example, the system can determine that an agent in a right-turn-only lane is going too fast to make a right turn, and therefore predict that the agent will continue straight through the intersection even though this maneuver is illegal. Furthermore, in some implementations described herein, the system can receive a planned path for the vehicle itself and incorporate the planned path into the predicted occupancy outputs.

Using techniques described in this specification, an occupancy prediction system can generate respective occupancy probabilities for each of multiple surrounding agents in a single forward pass. This is an improvement over existing techniques that generate an occupancy prediction for a single surrounding agent at a time, and then combine the occupancy predictions for each surrounding agent to generate the occupancy output. Generating an occupancy output in a single forward pass, regardless of the number of surrounding agents in the environment, can significantly decrease the computation time of the occupancy prediction system, which is a particularly useful feature for a system that is deployed on-board a vehicle.

As a particular example, in dense urban environments, there are often many pedestrians moving in the environment, and it can be impractical or impossible to generate predicted paths for each and every pedestrian. These scenarios require a more holistic approach to the environment. Systems described in this specification can generate occupancy outputs for a large number pedestrians that predict, for each location in the environment, whether any pedestrians will occupy that location, regardless of which particular pedestrian will do so. Thus, the system can model the behavior of multiple agents together without tracking any single agent in particular.

Some other existing systems rely on multiple neural networks that each generate a prediction corresponding to a single particular future time point, and have to be trained separately. Then at inference time, the on-board system has to run each of the neural networks separately to generate respective occupancy outputs for each of the future time points. However, often a time limitation makes it infeasible for an on-board system to perform more than one or a few inference calls when making occupancy predictions. Some systems described in this specification can efficiently generate occupancy predictions for multiple different future time points in parallel.

Some existing techniques rely on different models for respective types of surrounding agent, e.g., by training each model to predict occupancy for a single agent type, and then running each model separately at inference time. Such techniques do not model the interactions between agents of different types, as the different models do not interact. Using techniques described in this specification, an occupancy prediction system can generate occupancy predictions for multiple agent types concurrently, e.g., in a single forward pass, allowing the different occupancy predictions to share information, e.g., through shared parameters.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a trained machine learning model, referred to in this specification as an "occupancy prediction system," to generate an occupancy output corresponding to each of one or more future time points and one or more surrounding agent types In this specification, a "surrounding agent" can refer, without loss of generality, to a vehicle, bicycle, pedestrian, ship, drone, or any other moving object in an environment. This specification also describes how training examples generated by vehicles can be used to effectively train the occupancy prediction system to accurately and reliably make predictions.

Figure 1:
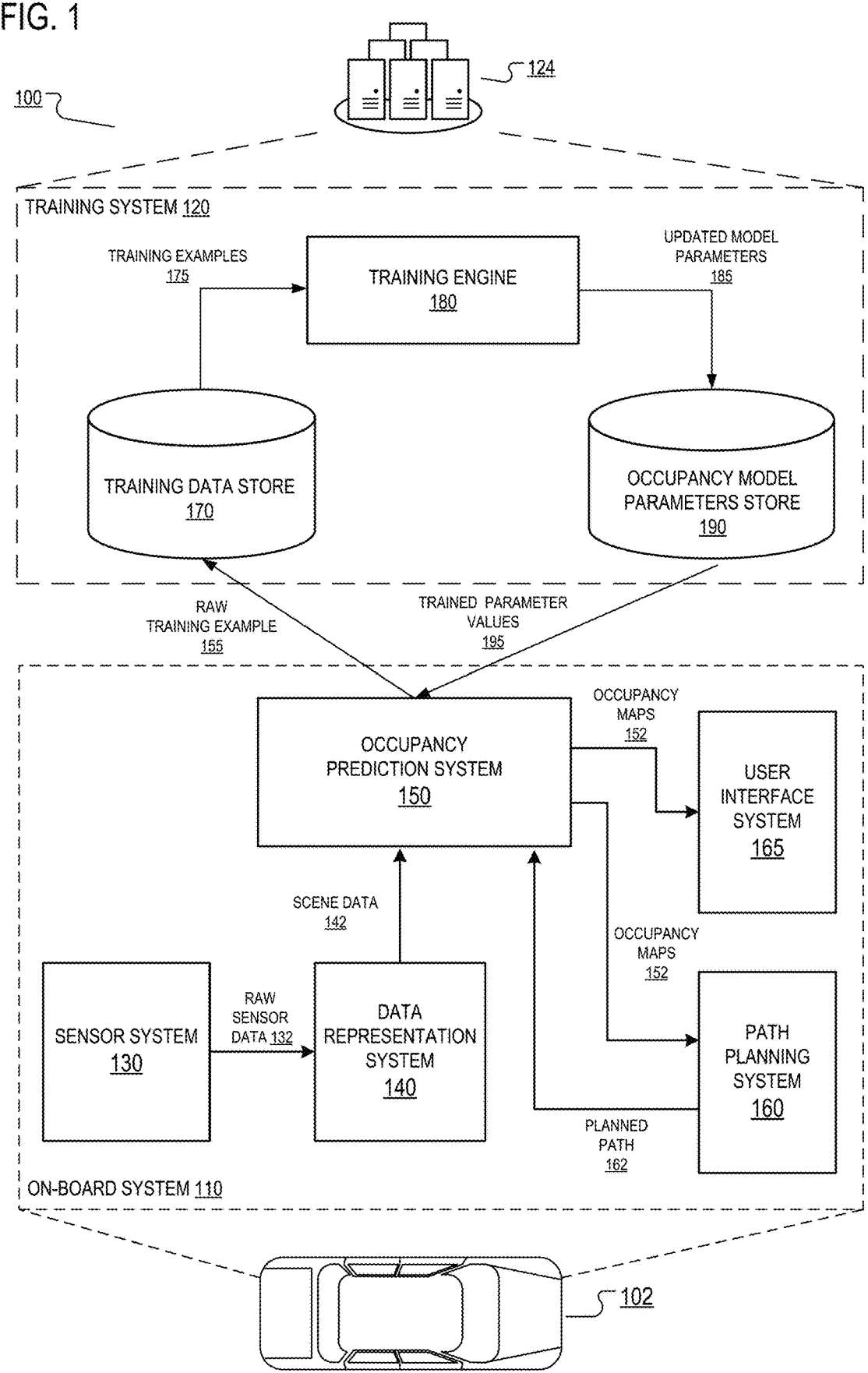
FIG. 1 is a diagram of an example system.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with another vehicle.

The on-board system 110 includes one or more sensor subsystems 130. The sensor subsystems 130 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 130 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position in a particular two-dimensional or three-dimensional coordinate space. In some implementations, the position is represented as a range and elevation pair. Each group of camera sensor measurements can be represented as an image patch, e.g., an RGB image patch.

Once the sensor subsystems 130 classify one or more groups of raw sensor measurements as being measures of respective other agents, the sensor subsystems 130 can compile the raw sensor measurements into a set of raw data 132, and send the raw data 132 to a data representation system 140.

The data representation system 140, also on-board the vehicle 102, receives the raw sensor data 132 from the sensor system 130 and generates scene data 142. The scene data 142 characterizes the current state of the environment surrounding the vehicle 102.

For example, the scene data can include, for all surrounding agents in the environment, a current state at the current time point and a previous state at one or more respective previous time points. The state of an agent at a time point can include the location of the agent at the time point and values for a predetermined set of motion parameters at the time point. As a particular example, the motion parameters can include a heading for the agent, a velocity of the agent, and/or an acceleration of the agent. In some implementations, the scene data also includes a current state of the vehicle at the current time point and a previous state of the vehicle at one or more respective previous time points. In some implementations, the scene data also includes a road graph of the environment, which can include the lanes of the road, cross walks, traffic lights, stop signs, etc., in the environment.

The different surrounding agents characterized by the scene data may or may not be tracked across the different time points. That is, although the scene data includes a state of each of the agents at each of the time points, the system may or may not associate a particular agent in a first time point with the same particular agent in a second time point. Thus, the representations of the same agent across different time points in the scene data can be independent, i.e., untracked. The tracking is not necessarily required because the occupancy prediction system 150 can generate an occupancy output for a particular agent type that does not predict the occupancies of individual agents of the agent type but rather the global behavior of all agents of the agent type. Removing the requirement to track individual surrounding agents across time points can make predicting occupancies much more efficient and accurate.

As a particular example, the scene data can include one or more top-down rendered images of the environment at each time point that includes depictions of the surrounding agents in the environment. For example, the scene data can include a single top-down rendered image of the environment for each time point, where agents of different agent types are depicted in different colors. As another example, there can be a different top-down rendered image for each agent type and for each time point, where a given top-down rendered image depicts only agent of the particular agent type at the particular time point.

In some implementations, the surrounding agents can be depicted as bounding boxes in the top-down rendered images. Bounding boxes are boxes of pixels in an image that identify the boundaries or edges of respective objects. In some other implementations, the surrounding agents can be depicted as contours in the top-down rendered images. Like bounding boxes, contours are another way of representing an estimate of the spatial extent of respective objects. Typically, unlike a bounding box, a contour does not depict an estimate of the spatial extent of a portion of an object that is occluded from the sensors of the vehicle 102, and therefore can be represented by more complex shapes than a box.

In some implementations, agents of some agent types are depicted using bounding boxes while agents of other agent types are depicted using contours. For example, bounding boxes can be a more effective representation for vehicles, while contours can be a more effective representation for pedestrians.

In some implementations, the top-down rendered images also include depictions of the road lanes and other road graph features.

The data representation system 140 provides the scene data 142 to an occupancy prediction system 150, also on-board the vehicle 102.

The occupancy prediction system 150 processes the scene data 142 to generate an occupancy output 152 corresponding each of multiple future time points and each of the agent types. That is, if there are r future time points and q different agent types, then the occupancy prediction system can generate p occupancy outputs, where p=qxr. As a particular example, there may be r=5 different future time points, extending one second into the future in increments of 0.2 seconds. As another particular example, there may be r=10 different future time points, extending 10 seconds into the future in increments of 1 second. As a particular example, there may be q=3 different agent types, corresponding to vehicles, pedestrians, and cyclists.

Each occupancy output characterizes a predicted state of the environment at a particular future time point for a particular agent type, where each position in the occupancy output corresponds to a location in the environment and has an occupation probability that characterizes the likelihood that a surrounding agent of the particular agent type will occupy the corresponding location in the environment at the particular future time point. Example architectures of the occupancy prediction system 150 are described with reference to FIGS. 2A and 2B.

The on-board system 110 also includes a path planning system 160. The path planning system 160 can make autonomous or semi-autonomous driving decisions for the vehicle 102, e.g., by generating a planned vehicle path that characterizes a path that the vehicle 102 will take in the future. In some implementations, the path planning system 160 provides the current planned path 162 to the occupancy prediction system 150, and the occupancy prediction system processes the planned path 162 as well as the scene data 142 to generate the occupancy outputs 152. For example, the planned path 162 can be represented using a top-down rendered image of the environment that depicts the planned path through the environment, e.g., with points in the image depicting a planned locations of the vehicle 102 at respective future time points, or with a single geometric curve in the image depicting the entire planned path.

In the implementations in which the occupancy prediction system 150 processes the planned path 162 of the vehicle, the occupancy outputs 152 are conditioned on the current planned path 162. That is, each occupancy output 152 characterizes a predicted state of the environment at a particular future time point for a particular agent type, assuming that the vehicle 102 follows the planned path 162 through the environment up until the particular future time point. In some implementations, the path planning system 160 can provide multiple planned paths 162, and the occupancy prediction system 150 can generate a set of occupancy outputs 152 corresponding to each of the planned paths 162.

In some implementations, for each future time point and agent type, the occupancy prediction system 150 can generate two occupancy outputs: a first occupancy output that predicts occupancies of agents that are currently in the environment and a second occupancy output that predicts occupancies of agents that are not currently in the environment but may enter the environment. This process is discussed in more detail below in reference to FIGS. 2A and 2B.

The on-board system 100 can provide the occupancy outputs 152 generated by the occupancy prediction system 150 to one or more other on-board systems of the vehicle 102, e.g., the path planning system 160 and/or a user interface system 165.

When the path planning system 160 receives the occupancy outputs 152, the path planning system 160 can use the occupancy outputs 152 to generate a new planned vehicle path. For example, the occupancy outputs 152 may contain a prediction that a particular surrounding agent is likely to cut in front of the vehicle 102 at a particular future time point, potentially causing a collision. In this example, the path planning system 160 can generate a new planned vehicle path that avoids the potential collision. For example, the path planning system 160 can generate a trajectory through the environment that causes the vehicle 102 to navigate through locations in the environment at respective future time points, such that each location has low occupancy probabilities for each agent type at the corresponding future time point according to the occupancy outputs 152. The vehicle 102 can then navigate to follow the new planned path and avoid the potential collision.

When the user interface system 165 receives the occupancy outputs 152, the user interface system 165 can use the occupancy outputs 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102). In a particular example, the occupancy outputs 152 may contain a prediction that a particular surrounding agent is likely to cut in front of the vehicle 102, potentially causing a collision. In this example, the user interface system 165 can present an alert message to the driver of the vehicle 102 with instructions to adjust the trajectory of the vehicle 102 to avoid a collision or notifying the driver of the vehicle 102 that a collision with the particular surrounding agent is likely.

To generate the occupancy outputs 152, the occupancy prediction system 150 can use trained parameter values 195 obtained from an occupancy model parameters store 190 in the training system 120.

The training system 120 is typically hosted within a data center 124, which can be a distributed computing system having hundreds or thousands of computers in one or more locations.

The training system 120 includes a training data store 170 that stores all the training data used to train the parameter values of the occupancy prediction system 150. The training data store 170 receives raw training examples from agents operating in the real world. For example, the training data store 170 can receive a raw training example 155 from the agent 102 and one or more other agents that are in communication with the training system 120. The raw training example 155 can be processed by the training system 120 to generate a new training example. The raw training example 155 can includes the scene data 142 that can be used as input for a new training example. The raw training example 155 can also include outcome data characterizing the state of the environment surrounding the vehicle 102 at the one or more future time points for the one or more agent types. This outcome data can be used to generate ground-truth outputs for the new training example, where each ground-truth output is an occupancy output corresponding to a particular future time point and a particular agent type. In some implementations, each ground-truth occupancy output for a future time point and agent type has '1's in positions corresponding to locations in the environment that are occupied by a surrounding agent of the agent type at the future time point, and '0's in all other positions.

The training data store 170 provides training examples 175 to a training engine 180, also hosted in the training system 120. The training engine 180 uses the training examples 175 to update model parameters that will be used by the occupancy prediction system 150, and provides the updated model parameters 185 to the occupancy model parameters store 190. Once the parameter values of the occupancy prediction system 150 have been fully trained, the training system 120 can send the trained parameter values 195 to the occupancy prediction system 150, e.g., through a wired or wireless connection.

Figure 2A:
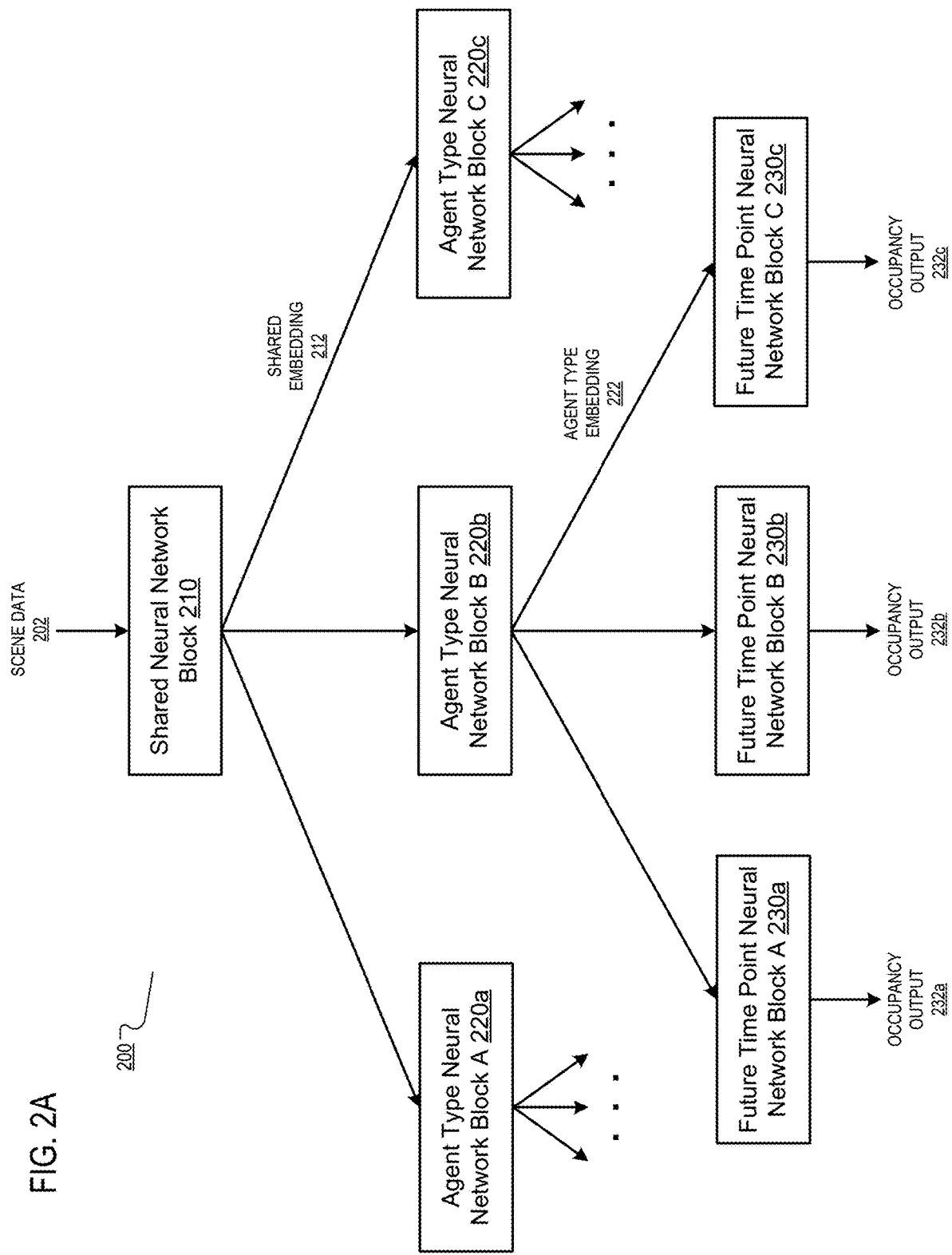
FIGS. 2A and 2B are illustrations of example architectures of neural networks for generating occupancy outputs.

FIG. 2A is an illustration of an example architecture of a neural network 200 for generating occupancy outputs. For example, the neural network could be part of an occupancy prediction system, e.g., the occupancy prediction system 150 depicted in FIG. 1.

The neural network 200 receives an input scene data 202, which characterizes the current state of an environment surrounding a vehicle. The neural network 200 is a feedforward neural network that generates multiple different occupancy outputs in a single forward pass. Each occupancy output can predict an occupancy probability for each of multiple locations in the environment for a particular agent type at a particular future time point.

A shared neural network block 210 receives the scene data 202 and processes the scene data 202 to generate a shared embedding 212 of the scene data 202. In this specification, an embedding is an ordered collection of numeric values that represents an input in a particular embedding space. For example, the embedding can be a vector of floating point or other numeric values that has a fixed dimensionality.

The shared neural network block 210 is referred to as "shared" because the shared neural network block 210 is shared by every agent type and every future time point. That is, the parameters of the shared neural network block 210 contribute to the occupancy output of each agent type and each future time point.

In some implementations, the scene data 202 includes multiple channels of images, e.g., channels of top-down image of the environment where each top-down image corresponds to a particular agent type at a particular previous time point or the current time point. In these implementations, the shared neural network block 210 can include one or more convolutional neural network layers that can process the input channels to generate the shared embedding 212. Each convolutional layer can be defined by a multi-dimensional (e.g., two- or three-dimensional) convolutional filter, thereby enabling the shared neural network block 210 to learn complex spatial relationships between different spatial regions of the environment and encode the spatial relationships in the shared embedding 212. As a particular example, the shared neural network block 210 can include several convolutional layers and several max pooling layers that decrease the size of the input channels, so that the shared embedding 212 includes one or more channels that are smaller than the input channels.

After the shared neural network block 210, the neural network 200 splits into different branches corresponding to respective agent types. That is, the shared neural network block 210 can provide the shared embedding 212 to each of q different agent type neural network blocks. As depicted in FIG. 2A, there are three agent type neural network blocks 220a-c, corresponding to three different agent types A, B, and C.

Each agent type neural network block 220a-c processes the shared embedding 212 to generate a respective agent type embedding. For example, the agent type neural network block 220b processes the shared embedding 212 to generate the agent type embedding 222 that corresponds to agent type B. Each agent type neural network block 220a-c has different parameters, allowing each agent type neural network block 220a-c to extract information from the shared embedding 212 that is particular to the corresponding agent type and encode the information in the corresponding agent type embedding. In some implementations, multiple agent type neural network blocks of the neural network 200 can process the shared embedding 212 in parallel.

After each agent type neural network block 220a-c, the neural network 200 splits again into different branches corresponding to respective future time points. For example, the agent type neural network block 220b provides the agent type embedding 222 to each of three future time point neural network blocks 230a-c, corresponding to three different future time points A, B, and C.

Each future time point neural network block 230a-c processes the agent type embedding 222 to generate a respective occupancy output. The future time point neural network block 230a generates an occupancy output 232a that corresponds to agent type B and future time point A. The future time point neural network block 230b generates an occupancy output 232b that corresponds to agent type B and future time point B. The future time point neural network block 230c generates an occupancy output 232a that corresponds to agent type B and future time point C. Each future time point neural network block 230a-c has different parameters, allowing each future time point neural network block 230a-c to extract information from the agent type embedding 222 that is particular to the corresponding future time point and use the information to generate the corresponding occupancy output. In some implementations, multiple future time point neural network blocks of the neural network 200 can process respective agent type embeddings in parallel.

In some implementations, the final layer of each future time point neural network block receives as input an un-normalized occupancy output that includes an un-normalized value for each location in the environment, and applies a sigmoid activation function to each un-normalized value to normalize the value to be between 0 and 1. Therefore, each value in the respective occupancy output can represent a probability, between 0 and 1, that an agent of the respective agent type will occupy the location at the respective future time point.

In some implementations, the future time point neural network blocks corresponding to the same future time point and different agent types can share some or all of their parameters. For example, the future time point neural network block 230a, which corresponds to future time point A and agent type B, can share parameters with a different future time point neural network block that is under the agent type neural network block 220a and that corresponds to future time point A and agent type A. In some other implementations, none of the neural network blocks in the neural network 200 shared parameters; rather, the parameters for each neural network block are learned independently during training of the neural network 200.

In some implementations, the occupancy outputs 232a-c are top-down images of the environment. That is, each occupancy output for a particular future time point and a particular agent type can include a top-down image where each pixel corresponds to a location in the environment and has a value characterizing the predicted occupancy probability for the corresponding location in the environment at the particular future time point for the particular agent type.

In some of the implementations in which the occupancy outputs 232a-c are top-down images and the scene data 202 includes one or more channels of top-down images, the occupancy outputs 232a-c have the same resolutions as the input channels of the scene data 202. That is, the occupancy outputs 232a-c and the input channels of the scene data 202 can have the same number of elements, e.g., pixels, so that every location represented by an element in the input channels of the scene data 202 is also represented by an element in the occupancy outputs 232a-c. In some such implementations, the agent type neural network blocks and/or the future time point neural network blocks can have one or more deconvolution layers that increase the size of shared embedding 212 so that the occupancy output is the same resolution as the scene data 202.

During training of the neural network 200, a training system can determine an error for each occupancy output according to a respective ground-truth occupancy output. For example, the training system can use cross-entropy loss between the predicted occupancy probability at a particular location and the "true" occupancy probability at the particular location, where the true occupancy probability is 1 if there was an agent of the respective agent type at the location at the respective future time point and 0 otherwise. The training system can then backpropagate each error through the neural network, updating the parameters of the neural network 200. For example, the training system can use an error in the occupancy output 232a to update parameters in the future time point neural network block 230a, the agent type neural network block 220b, and the shared neural network block 210. As another example, the training system can use an error in the occupancy output 232b to update parameters in the future time point neural network block 230b, the agent type neural network block 220b, and the shared neural network block 210. Therefore, the shared neural network block 210 can be updated according to errors in each of the occupancy outputs, allowing the shared neural network block 210 to learn to generate shared embeddings that can be leveraged to generate occupancy outputs for each future time point and each agent type. Similarly, each agent type neural network block can be updated according to errors in each occupancy output corresponding to the same agent type and respective future time points, allowing the agent type neural network block to learn to generated agent type embeddings that can be leveraged to generate occupancy outputs for each future time point.

Although the neural network 200 is illustrated as generating occupancy outputs corresponding to three future time points and three agent types, it should be understood that the neural network 200 could be configured to generate occupancy outputs for any number of future time points and agent types.

In some implementations, each occupancy output 232i includes a first occupancy output that corresponds to surrounding agents that are currently in the environment and a second occupancy output that corresponds to surrounding agents that are not currently in the environment. That is, for an occupancy output corresponding to a particular agent type and a particular future time point, the first occupancy output can predict, for each location in the environment, whether the location will be occupied by an agent of the particular agent type that is currently in the environment will occupy the location at the particular future time point. The second occupancy output can predict, for each location in the environment, whether the location will be occupied by an agent of the particular type that is not currently in the environment will occupy the location at the particular future time point, i.e., whether an agent of the particular type will enter the environment from a location outside of the environment and occupy the location at the particular future time point. For example, each future time point neural network block 230i can have a first branch that generates the first occupancy output and a second branch that generates the second occupancy output. In these implementations, the neural network 200 can be trained using ground-truth occupancies corresponding to agents currently in the environment for the first occupancy output and ground-truth occupancies corresponding to agents not currently in the environment for the second occupancy output.

Figure 2B:
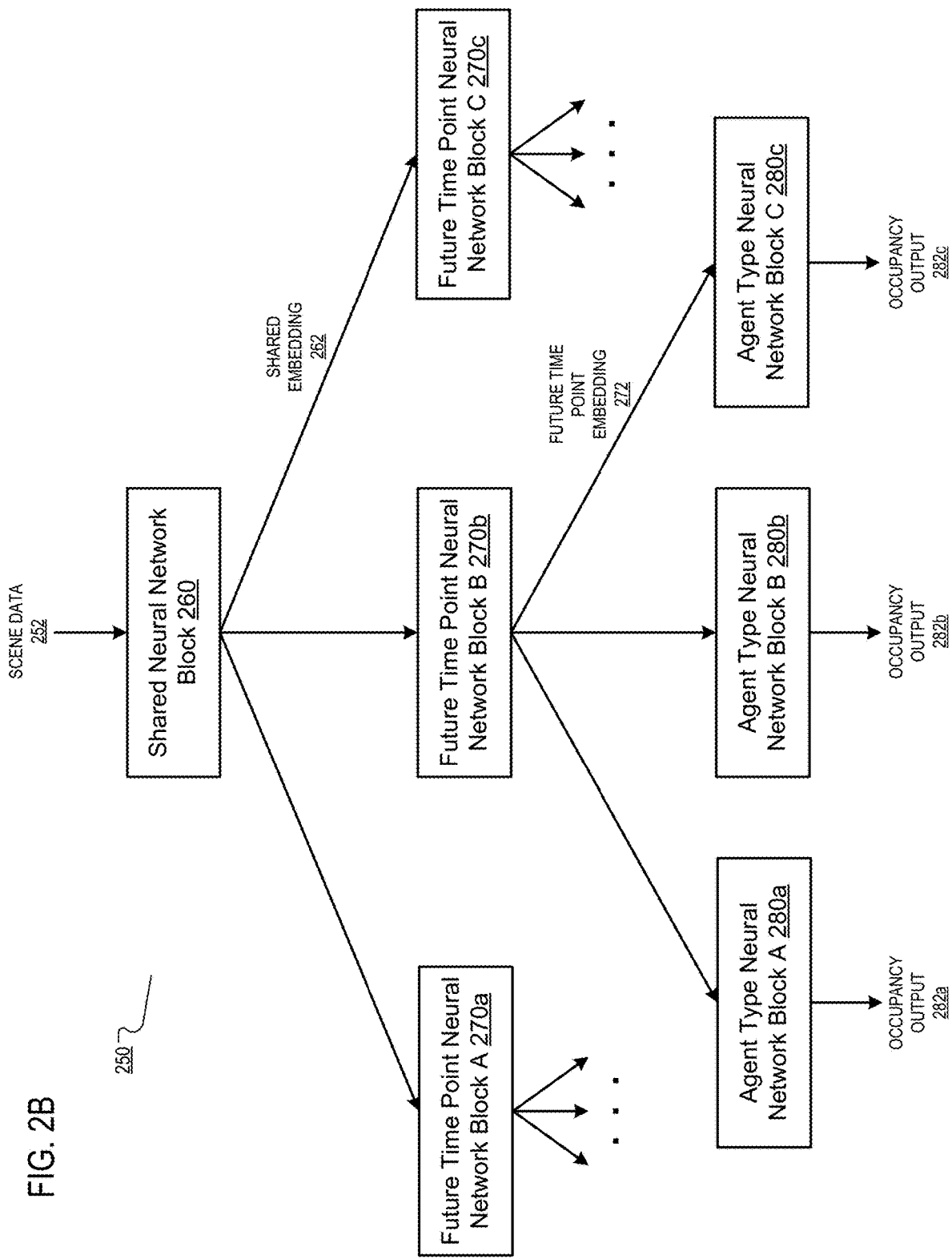

FIG. 2B is an illustration of an example architecture of another neural network 250 for generating occupancy outputs. For example, the neural network could be part of an occupancy prediction system, e.g., the occupancy prediction system 150 depicted in FIG. 1.

The neural network 250 receives an input scene data 252, which characterizes the current state of an environment surrounding a vehicle. The neural network 250 is a feedforward neural network that generates multiple different occupancy outputs in a single forward pass.

A shared neural network block 260 receives the scene data 252 and processes the scene data 252 to generate a shared embedding 262 of the scene data 252. As before, the shared neural network block 260 can include one or more convolutional neural network layers that can process input channels in the scene data 252 to generate the shared embedding 262.

After the shared neural network block 260, the neural network 250 splits into different branches corresponding to respective future time points. That is, the shared neural network block 260 can provide the shared embedding 212 to each of r different future time point neural network blocks. As depicted in FIG. 2B, there are three future time point neural network blocks 270*a-c*, corresponding to three future time points A, B, and C.

Each future time point neural network block 270*a-c* processes the shared embedding 262 to generate a respective future time point embedding. For example, the future time point neural network block 270*b* processes the shared embedding 262 to generate the future time point embedding 272 that corresponds to future time point B. Each future time point neural network block 270*a-c* has different parameters, allowing each future time point neural network block 270*a-c* to extract information from the shared embedding 262 that is particular to the corresponding future time point and encode the information in the corresponding future time point embedding. In some implementations, multiple future time point neural network blocks of the neural network 250 can process the shared embedding 262 in parallel.

After each future time point neural network block 270*a-c*, the neural network 250 splits again into different branches corresponding to respective agent types. For example, the future time point neural network block 270*b* provides the future time point embedding 272 to each of three agent type neural network blocks 280*a-c*, corresponding to three different agent types A, B, and C.

Each agent type neural network block 280*a-c* processes the future time point embedding 272 to generate a respective occupancy output. For example, the agent type neural network block 280*a* generates an occupancy output 282*a* that corresponds to future time point B and agent type A. Each agent type neural network block 280*a-c* has different parameters, allowing each agent type neural network block 280*a-c* to extract information from the future time point embedding 272 that is particular to the corresponding agent type and use the information to generate the corresponding occupancy output. In some implementations, multiple agent type neural network blocks of the neural network 250 can process respective future time point embeddings in parallel.

In some implementations, the final layer of each agent type neural network block receives as input an un-normalized occupancy output that includes an un-normalized value for each location in the environment, and applies a sigmoid activation function to each un-normalized value to normalize the value to be between 0 and 1. Therefore, each value in the respective occupancy output can represent a probability, between 0 and 1, that an agent of the respective agent type will occupy the location at the respective future time point.

In some implementations, the agent type neural network blocks corresponding to the same agent type and different future time points can share some or all of their parameters. For example, the agent type neural network block 280*a*, which corresponds to agent type A and future time point B, can share parameters with a different agent type neural network block that is under the future time point neural network block 270*a* and that corresponds to agent type A and future time point A. In some other implementations, none of the neural network blocks in the neural network 250 shared parameters; rather, the parameters for each neural network block are learned independently during training of the neural network 250.

In some implementations, the occupancy outputs 282*a-c* are top-down images of the environment. In some implementations, the top-down images have the same resolutions as the input channels of the scene data 252. In some such implementations, the agent type neural network blocks and/or the future time point neural network blocks can have one or more deconvolution layers that increase the size of shared embedding 262 so that the occupancy output is the same resolution as the scene data 252.

During training of the neural network 250, a training system can determine an error for each occupancy output according to a respective ground-truth occupancy output. For example, the training system can use cross-entropy loss between the predicted occupancy probability at a particular location and the true occupancy probability at the particular location. The training system can then backpropagate each error through the neural network, updating the parameters of the neural network 250. For example, the training system can use an error in the occupancy output 282*a* to update parameters in the agent type neural network block 280*a*, the future time point neural network block 270*b*, and the shared neural network block 260. Therefore, the shared neural network block 260 can be updated according to errors in each of the occupancy outputs, allowing the shared neural network block 260 to learn to generate shared embeddings that can be leveraged to generate occupancy outputs for each future time point and each agent type. Similarly, each future time point neural network block can be updated according to errors in each occupancy output corresponding to the same future time point and respective agent types, allowing the future time point neural network block to learn to generated future time point embeddings that can be leveraged to generate occupancy outputs for each agent type.

Although the neural network 250 is illustrated as generated occupancy outputs corresponding to three future time points and three agent types, it should be understood that the neural network 250 could be configured to generate occupancy outputs for any number of future time points and agent types.

As before, in some implementations, each occupancy output 282*i* includes a first occupancy output that corresponds to surrounding agents that are currently in the environment and a second occupancy output that corresponds to surrounding agents that are not currently in the environment. For example, each agent type neural network block 280*i* can have a first branch that generates the first occupancy output and a second branch that generates the second occupancy output. In these implementations, the neural network 250 can be trained using ground-truth occupancies corresponding to agents currently in the environment for the first occupancy output and ground-truth occupancies corresponding to agents not currently in the environment for the second occupancy output.

Figure 3A:
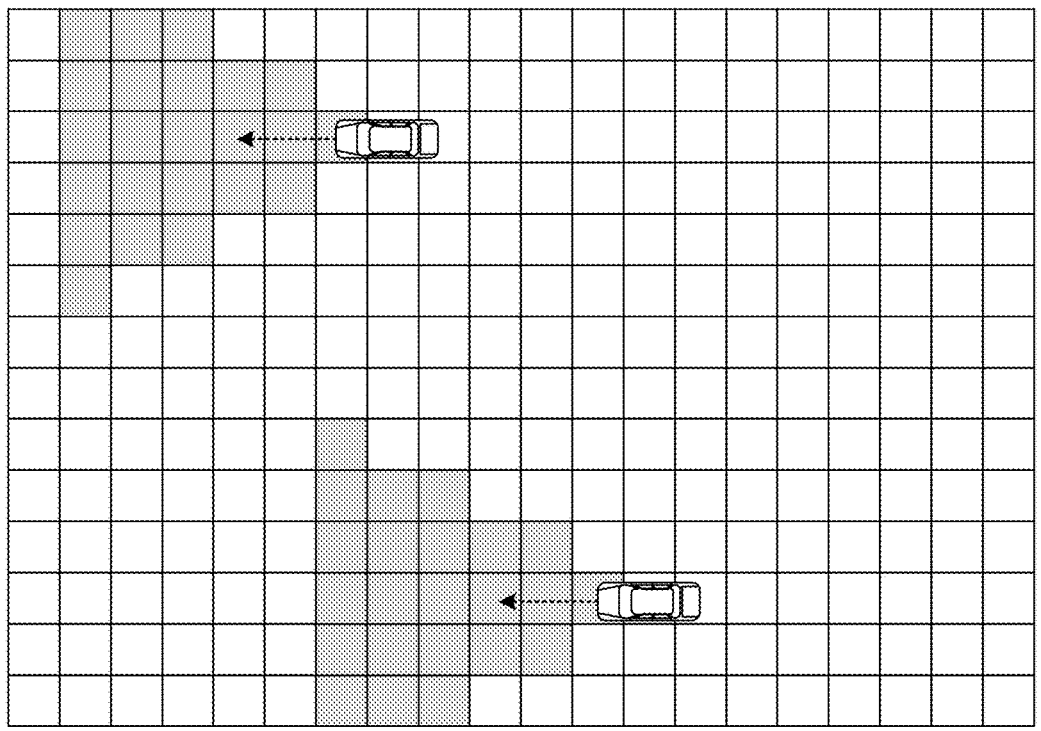
FIGS. 3A and 3B are illustrations of example occupancy outputs corresponding to an environment surrounding a vehicle.

FIG. 3A is an illustration of example occupancy outputs 310 and 320 corresponding to an environment surrounding a vehicle. The environment contains two surrounding agents of a particular agent type. While the two surrounding agents are illustrated as automobiles, it should be understood that the surrounding agents can of any appropriate agent type, e.g., pedestrians, cyclists, etc.

The occupancy outputs 310 and 320 are example two-dimensional arrays generated by a trained occupancy prediction system, e.g., the occupancy prediction system 150 depicted in FIG. 1. The arrays each represent a "top-down" perspective of the environment, where each position corresponds to a respective location in the environment.

In some implementations where the input to the occupancy prediction system is scene data represented as top-down images of the environment, the occupancy output arrays can have the same dimensions as the input channels, so that a position in an output array characterizes the same location in the environment as the corresponding position in the input channel.

The value at each position of an occupancy output corresponds to the occupancy probability of the respective location. In some implementations, an image can be created depicting the occupancy output, where a respective block of one or more pixels corresponds to each position in the array, and higher occupancy probabilities are depicted as darker grayscale values of the respective block of pixels. Such an image can be useful during training of the occupancy prediction system, e.g., to allow a user to visually inspect the progress of the training of the system.

The first occupancy output 310 corresponds to a future time point that is in the relatively near future, e.g., 1 second. For each of the two surrounding agents, the positions in the first occupancy output 310 that have a non-zero occupancy probability are illustrated in dark-gray. The dark-gray positions can, for example, signify an occupancy probability of $0.14 \approx 1/7$, because there are 7 non-zero occupancy probabilities per surrounding agent.

The first occupancy output 310 is a simplification; it should be understood that the respective occupancy probability of each position could all be different. For example, there could be one or more locations that are reachable by both surrounding agents. In this case, the occupancy probability for these locations will be higher than for surrounding locations because it characterizes the collected likelihood that either one of the surrounding agents will occupy the location, or both. As another example, a single surrounding agent might occupy multiple different locations in the environment at the future time point, e.g., if the surrounding agent is on a boundary between a first location and a second location in the environment.

The second occupancy output 320 corresponds to a future time point that is relatively distant compared to the first occupancy output 310, e.g., 2 seconds. For each of the two surrounding agents, the positions in the second occupancy output 320 that have a non-zero occupancy probability are illustrated in light-gray. The light-gray positions can, for example, signify an occupancy probability of $0.04 \approx 1/23$, because there are 23 non-zero occupancy probabilities per surrounding agent. Here, the occupancy probability are more evenly distributed because the future time point is more distant, and therefore the behavior of the surrounding agents is more uncertain. In general, a longer time horizon leads to more diffusion of the occupancy probabilities.

Figure 3A:
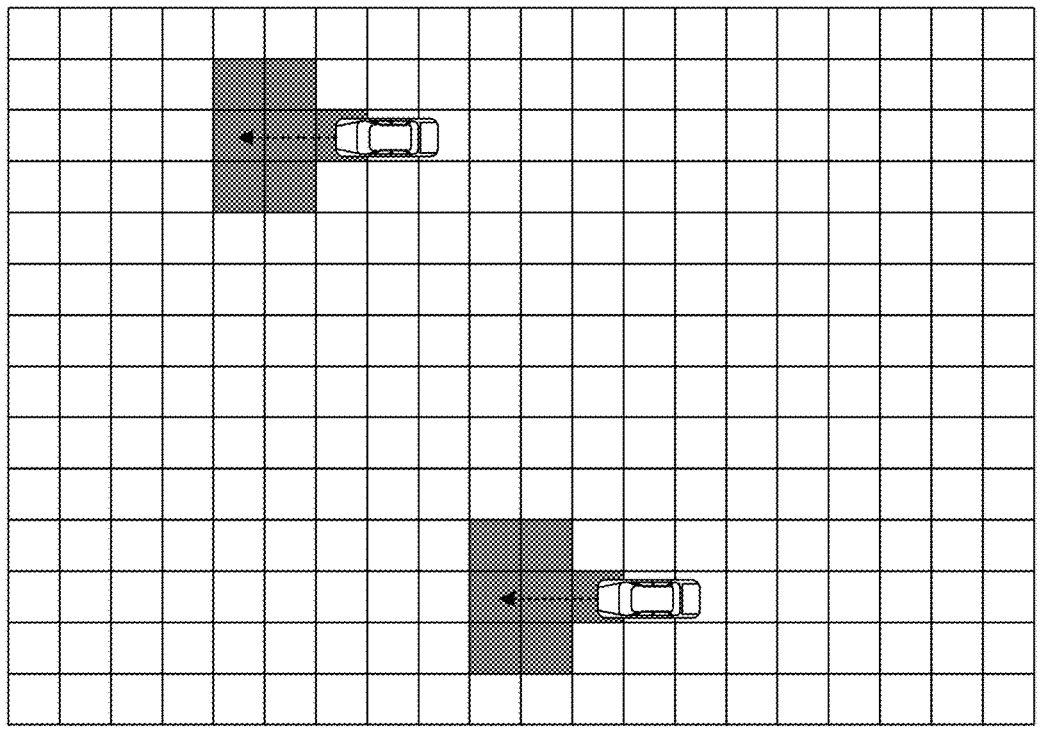
Figure 3B:
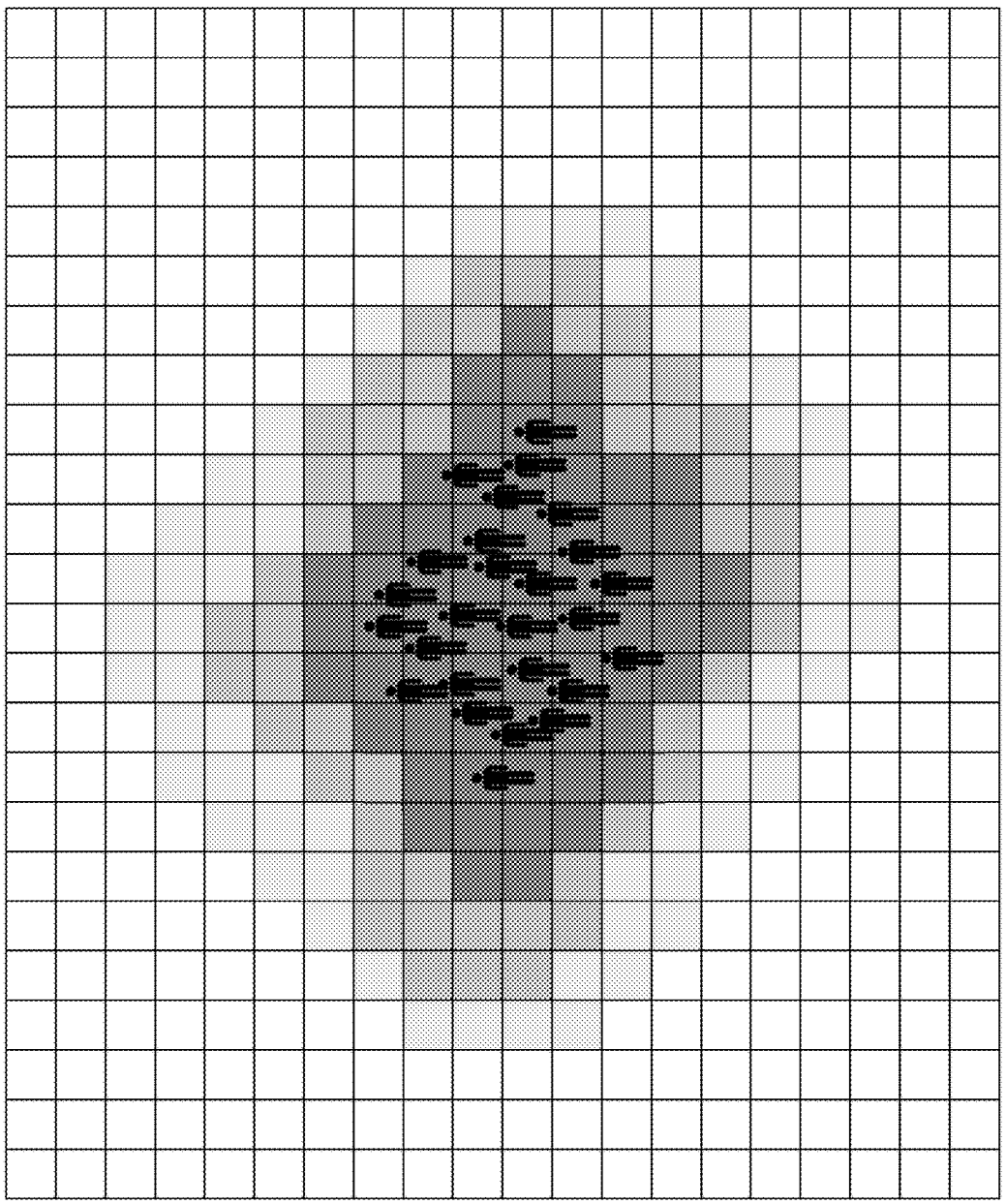

FIG. 3B is an illustration of another example occupancy output 330 corresponding to an environment surrounding a vehicle. The environment contains multiple pedestrians in a crowd.

The occupancy output 330 is an example two-dimensional array generated by a trained occupancy prediction system, e.g., the occupancy prediction system 150 depicted in FIG. 1. The arrays each represents a "top-down" perspective of the environment, where each position corresponds to a respective location in the environment.

The value at each position of an occupancy output corresponds to the occupancy probability of the respective location. In some implementations, an image can be created depicting the occupancy output, where a respective block of one or more pixels corresponds to each position in the array, and higher occupancy probabilities are depicted as darker grayscale values of the respective block of pixels.

The occupancy output 330 corresponds to a future time point, e.g., 2 seconds in the future. The positions in the occupancy output 330 that have a non-zero probability of being occupied by any pedestrian at the future time point are illustrated in a shade of gray. For example, the positions with a high occupancy probability are illustrated in dark gray, the positions with a slightly lower occupancy probability are illustrated in medium gray, and the positions with an even lower but non-zero occupancy probability are illustrated in light gray.

None of the pedestrians in the occupancy output 330 are being tracked from time point to time point; the occupancy output 330 represents, for each position, the collective probability that any one or more of the pedestrians will occupy the position in the future time point, regardless of precisely which pedestrians may do so.

In dense urban situations such as the environment illustrated in FIG. 3, it is very difficult for an agent tracking system of a vehicle to perfectly segment the different pedestrians and track them over time. Furthermore, because the sensors of the vehicle are observing the environment from a perspective view, there may be many occlusions at different time points that make segmenting and tracking difficult. Thus, an occupancy prediction system that really relies on tracking individual pedestrians may perform poorly in these dense urban environments because the inputs to such an occupancy prediction system are so noisy. A probabilistic occupancy output such as the one illustrated in FIG. 3, on the other hand, is able to express uncertainty in the environment, and can generate accurate predictions without tracking individual pedestrians.

In some implementations, for each location in the environment, the occupancy outputs 310, 320, and 330 predict whether any surrounding agent of the appropriate type, including surrounding agents currently in the environment and surrounding agents that are not currently in the environment, will occupy the location at the future time point. In these implementations, during training of the occupancy prediction system, the occupancy prediction system can process training examples where surrounding agents that were not in the environment at the current time point corresponding to the training example enter the environment, and are therefore represented in the ground truth occupancy output for the future time point. By generating parameter updates for the occupancy prediction system using errors in the occupancy outputs generated by the occupancy prediction system in response to processing such training examples, a training system can train the occupancy prediction system to be able to predict when surrounding agents will enter the environment using the input scene data.

As a particular example, if roadgraph information in the input scene data characterizes a crosswalk near the edge of the environment for pedestrians moving into the environment, then the occupancy prediction system can learn that a pedestrian might be likely to enter the environment.

In some other implementations, for each location in the environment, the occupancy outputs 310, 320 and 330 predict only whether one of the surrounding agents of the appropriate agent type currently in the environment will occupy the location at the future time point.

In either of these implementations, the occupancy prediction system can be trained to predict that one or more surrounding agents is likely to exit the environment before the future time point. During training of the occupancy prediction system, the occupancy prediction system can process training examples where surrounding agents that were in the environment at the current time point corresponding to the training example exit the environment, and are therefore not represented in the ground truth occupancy output. By generating parameter updates for the occupancy prediction system using errors in the occupancy outputs generated by the occupancy predictions system in response to processing such training examples, a training system cna train the occupancy prediction system to be able to predict when surrounding agents will exit the environment using the input scene data. As a particular example, if a training example characterizes a surrounding agent near the edge of the environment moving fast towards the edge of the environment, then the occupancy prediction system can learn that the surrounding agent might be likely to leave the environment.

Figure 4:
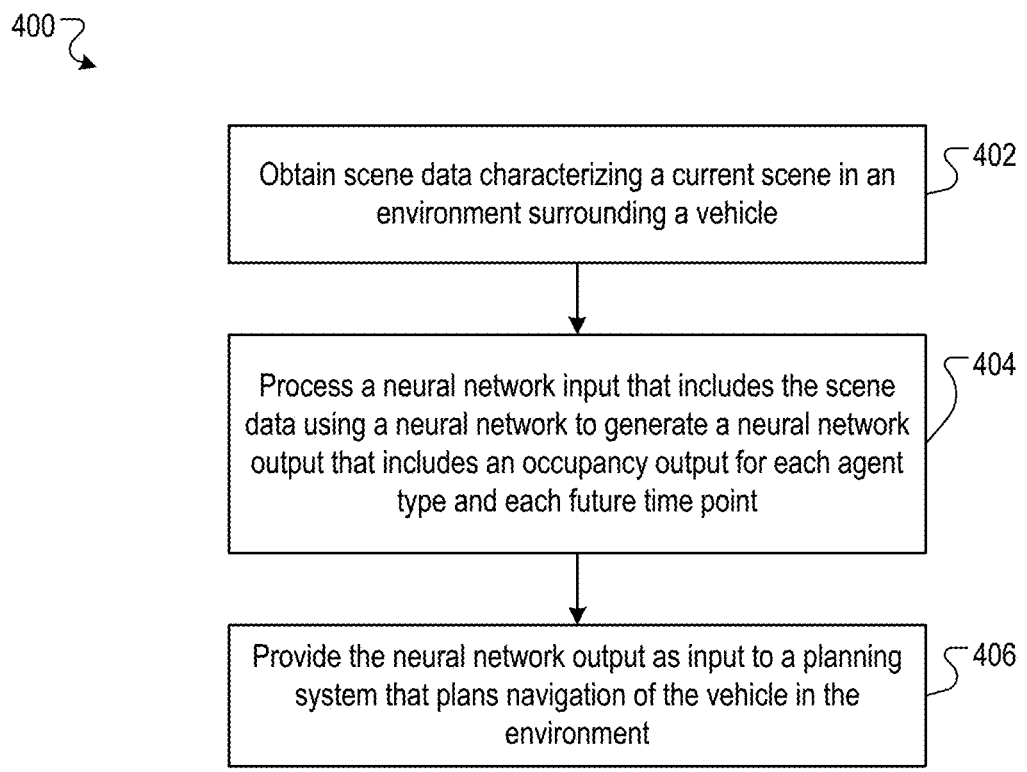
FIG. 4 is a flow diagram of an example process for generating an occupancy output.

FIG. 4 is a flow diagram of an example process 400 for generating an occupancy output. For convenience, the process 400 will be described as being performed by a system of one or more computers located in one or more locations. For example, an occupancy prediction system, e.g., the occupancy prediction system 150 of FIG. 1, appropriately programmed in accordance with this specification, can perform the process 400.

The system obtains scene data characterizing a current scene in an environment surrounding a vehicle (step 402). For example, the scene data can include, for each of multiple agent types, respective locations of agents of the agent type in the environment at one or more previous time points. The scene data can include, for each previous time point, a top-down rendered image of the environment at the previous time point depicting each agent of the agent type.

The system processes a neural network input that includes the scene data using a neural network to generate a neural network output that includes an occupancy output for each of multiple agent types and each of multiple future time points (step 404). The occupancy output for each agent type at each future time point can include respective occupancy probabilities for each of a multiple locations in the environment, where the occupancy probability for each location characterizes a likelihood that an agent of the agent type will occupy the location at the future time point.

In some implementations, the occupancy output includes multiple cells in a map, where each cell corresponds to a location in the environment and has an occupancy probability that an agent of the respective agent type will occupy the corresponding real-world location at the respective future time point.

The neural network can, e.g., have an architecture similar to those depicted in FIGS. 2A and 2B.

In some implementations, the neural network input also includes vehicle data for the vehicle in the environment, where the vehicle data includes a planned path of the vehicle. For example, the planned path of the vehicle can include a respective planned location of the vehicle in the environment at each of one or more future time steps. In these implementations, the neural network output can be conditioned on the vehicle path.

The system provides the neural network output as input to a planning system that plans navigation of the vehicle in the environment (step 406). For example, the planning system of the vehicle can include an optimization-based planner that is configured to process the neural network output to generate a constraint in the optimization for each particular location in the environment that has an occupancy probability that surpasses a predetermined threshold in the occupancy output for a respective agent type at a respective particular future time point, e.g., a threshold of 0, 0.05, or 0.1. As a particular example, the planning system can generate a constraint in the optimization for each particular location in the environment that has a non-zero occupancy probability in the occupancy output for a respective agent type at a respective particular future time point. The constraint for a particular location can correspond to the particular future time point at which an agent of the respective agent type is predicted to occupy the particular location. The constraint can penalize planned paths of the vehicle that plan for the vehicle to be in the particular location at the particular future time point.

As a particular example, the planning system can determine which cells of each occupancy output have a predicted occupancy probability that is higher than a threshold occupancy probability. These cells corresponds to particular points in the environment in space and time. The planning system can then add a constraint in the optimization framework of the optimization-based planner that punished planned paths for occupying one or more of the particular points in the environment. These constraints can be either hard constrains (where the planner is disallowed to generate planned paths that occupy these points) or soft constraints (where such planned paths are penalized but still allowed), depending on the optimization framework that has been deployed for the planner. For example, if the planning system establishes a higher threshold, then the planning system may add hard constraints on the points, as the points correspond to a relatively high probability of collision.

For example, as described above, in some implementations, the input to a trained occupancy prediction system that generates occupancy outputs can include one or more top-down rendered images of the environment, where surrounding agents in the environment are depicted, e.g., using bounding boxes or contours. In these implementations, the spatial extents of the surrounding agents are implicitly modeled in the input; thus, the trained occupancy prediction system can determine which locations in the environment will be occupied by any portion of the spatial extent a surrounding agent. A planning system of the vehicle can then determine which potential future locations of the vehicle will overlap any portion of a surrounding agent at a particular future time point, and thus avoid collisions. Some existing planning systems rely on predicted trajectories of surrounding agents, which do not encode information about the spatial extent of the surrounding agents. Therefore, these existing systems must explicitly model the spatial extent of the surrounding agent at each point along the trajectory in order to determine which potential future locations of the vehicle would overlap any portions of a surrounding agent, which can be less reliable and more computationally expensive.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
obtaining scene data characterizing a current scene in an environment; and
processing a neural network input comprising the scene data using a neural network to generate a neural network output, wherein:
the neural network output comprises respective occupancy outputs corresponding to a plurality of agent types at one or more future time points;
the occupancy output for each agent type at a first future time point comprises respective occupancy probabilities for a plurality of locations in the environment; and
in the occupancy output for each agent type at the first future time point, the respective occupancy probability for each location characterizes a likelihood that an agent of the agent type will occupy the location at the first future time point.

Embodiment 2 is the method of embodiment 1, wherein the scene data comprises, for each agent type, respective locations of agents of the agent type in the environment at one or more previous time points.

Embodiment 3 is the method of embodiment 2, wherein the scene data comprises, for a first previous time point:
a top-down rendered image of the environment at the first previous time point, wherein the top-down rendered image comprises one or more pixels depicting an occupancy of an agent of the agent type.

Embodiment 4 is the method of embodiment 3, wherein the top-down rendered image for a particular agent type at the first previous time point comprises one or more of:
a plurality of first pixels depicting a bounding box for an agent of the particular agent type;
a plurality of second pixels depicting a contour for an agent of the particular agent type; or
a plurality of third pixels depicting road lanes in the environment.

Embodiment 5 is the method of any one of embodiments 1-4, wherein the occupancy output for each agent type at the first future time point comprises a plurality of cells corresponding to locations in the environment, wherein each cell has an occupancy probability that an agent of the respective agent type will occupy the corresponding location at the first future time point.

Embodiment 6 is the method of embodiment 5, wherein a resolution of the occupancy outputs is the same as a resolution of the scene data.

Embodiment 7 is the method of any one of embodiments 1-6, wherein the scene data characterizes the environment at each of a plurality of previous time points, and wherein a first representation of a first agent at a first previous time point is independent from a second representation of the first agent at a second previous time point.

Embodiment 8 is the method of any one of embodiments 1-7, wherein the neural network is a feedforward convolutional neural network comprising:
a plurality of shared neural network layers that process the scene data to generate a shared embedding; and
a plurality of blocks of second neural network layers each corresponding to a respective agent type, wherein each block of second neural network layers processes the shared embedding to generate an occupancy output for the corresponding agent type.

Embodiment 9 is the method of embodiment 8, wherein the neural network processes the shared embedding to generate an occupancy output for each agent type in parallel.

Embodiment 10 is the method of any one of embodiments 8 or 9, wherein each block of second neural network layers comprises a plurality of blocks of third neural network layers that each correspond to a respective future time point, wherein processing the shared embedding comprises, for each block of second neural network layers:
processing the shared embedding using a plurality of second neural network layers to generate an agent type embedding for the corresponding agent type; and
processing, for each block of third neural network layers, the agent type embedding using the block of third neural network layers to generate an occupancy output for the corresponding agent type at the corresponding future time point.

Embodiment 11 is the method of embodiment 10, wherein the neural network processes, for each agent type, the agent type embedding to generate an occupancy output for the agent type for each future time point in parallel.

Embodiment 12 is the method of any one of embodiments 1-11, wherein the neural network input comprises vehicle data, the vehicle data comprising a respective planned location of a vehicle in the environment at each of the one or more future time points.

Embodiment 13, is the method of any one of embodiments 1-12, further comprising:
providing the neural network output as input to a planning system that plans navigation of a vehicle in the environment.

Embodiment 14 is the method of embodiment 13, wherein the planning system of the vehicle comprises an optimization-based planner that is configured to process the neural network output to generate a constraint on each location in the environment that has an occupancy probability in a respective occupancy output that surpasses a predetermined threshold.

Embodiment 15 is the method of any one of embodiments 1-14, wherein the agent types comprise one or more of:
a vehicle type,
a cyclist type, or
a pedestrian type.

Embodiment 16 is the method of any one of embodiments 1-15, wherein the neural network output comprises, for each agent type:
a first occupancy output comprising, for the plurality of locations in the environment, a respective first occupancy probability characterizing a likelihood that an agent of the agent type that is in the environment at a current time point will occupy the location at the first future time point, and
a second occupancy output comprising, for the plurality of locations in the environment, a respective second occupancy probability characterizing a likelihood that an agent of the agent type that is not in the environment at the current time point will occupy the location at the first future time point.

Embodiment 17 is a system comprising: one or more computers and one or more storage devices storing instructions that are operable, when executed by the one or more computers, to cause the one or more computers to perform the method of any one of embodiments 1 to 16.

Embodiment 18 is a computer storage medium encoded with a computer program, the program comprising instructions that are operable, when executed by data processing apparatus, to cause the data processing apparatus to perform the method of any one of embodiments 1 to 16.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
obtaining scene data characterizing a current scene in an environment being navigated through by a vehicle;
processing a neural network input comprising the scene data using a neural network to generate a neural network output, wherein:
the neural network output comprises respective occupancy outputs corresponding to a plurality of agent types at one or more future time points;
the occupancy output for each agent type at a first future time point comprises respective occupancy probabilities for a plurality of cells, each cell corresponding to a respective one of a plurality of locations in the environment; and
in the occupancy output for each agent type at the first future time point, the respective occupancy probability for each cell characterizes a likelihood that an agent of the agent type will occupy the corresponding location in the environment at the first future time point; and
providing the neural network output as input to one or more systems located on-board the vehicle for use in controlling navigation of the vehicle.

2. The method of claim 1, wherein the scene data comprises, for each agent type, respective locations of agents of the agent type in the environment at one or more previous time points.

3. The method of claim 2, wherein the scene data comprises, for a first previous time point:
a top-down rendered image of the environment at the first previous time point, wherein the top-down rendered image comprises one or more pixels depicting an occupancy of an agent of the agent type.

4. The method of claim 3, wherein the top-down rendered image for a particular agent type at the first previous time point comprises one or more of:
a plurality of first pixels depicting a bounding box for an agent of the particular agent type;
a plurality of second pixels depicting a contour for an agent of the particular agent type; or
a plurality of third pixels depicting road lanes in the environment.

5. The method of claim 3, wherein a resolution of the respective occupancy outputs is the same as a resolution of the scene data.

6. The method of claim 1, wherein the scene data characterizes the environment at each of a plurality of previous time points, and wherein a first representation of a first agent at a first previous time point is independent from a second representation of the first agent at a second previous time point.

7. The method of claim 1, wherein the neural network is a feedforward convolutional neural network comprising:
a plurality of shared neural network layers that process the scene data to generate a shared embedding; and
a plurality of blocks of second neural network layers each corresponding to a respective agent type, wherein each block of second neural network layers processes the shared embedding to generate an occupancy output for the corresponding agent type.

8. The method of claim 7, wherein the neural network processes the shared embedding to generate an occupancy output for each agent type in parallel.

9. The method of claim 7, wherein each block of second neural network layers comprises a plurality of blocks of third neural network layers that each correspond to a respective future time point, wherein processing the shared embedding comprises, for each block of second neural network layers:
   processing the shared embedding using a plurality of second neural network layers to generate an agent type embedding for the corresponding agent type; and
   processing, for each block of third neural network layers, the agent type embedding using the block of third neural network layers to generate an occupancy output for the corresponding agent type at the corresponding future time point.

10. The method of claim 9, wherein the neural network processes, for each agent type, the agent type embedding to generate an occupancy output for the agent type for each future time point in parallel.

11. The method of claim 1, wherein the neural network input comprises vehicle data, the vehicle data comprising a respective planned location of a vehicle in the environment at each of the one or more future time points.

12. The method of claim 1, wherein the one or more systems located on-board the vehicle comprise
   a planning system that plans navigation of a vehicle in the environment.

13. The method of claim 12, wherein the planning system of the vehicle comprises an optimization-based planner that is configured to process the neural network output to generate a constraint on each location in the environment that has an occupancy probability in a respective occupancy output that surpasses a predetermined threshold.

14. The method of claim 1, wherein the agent types comprise one or more of:
   a vehicle type,
   a cyclist type, or
   a pedestrian type.

15. The method of claim 1, wherein the neural network output comprises, for each agent type:
   a first occupancy output comprising, for the plurality of locations in the environment, a respective first occupancy probability characterizing a likelihood that an agent of the agent type that is in the environment at a current time point will occupy the location at the first future time point, and
   a second occupancy output comprising, for the plurality of locations in the environment, a respective second occupancy probability characterizing a likelihood that an agent of the agent type that is not in the environment at the current time point will occupy the location at the first future time point.

16. A system comprising one or more computers and one or more storage devices storing instructions that are operable, when executed by the one or more computers, to cause the one or more computers to perform operations comprising:
   obtaining scene data characterizing a current scene in an environment being navigated through by a vehicle;
   processing a neural network input comprising the scene data using a neural network to generate a neural network output, wherein:
      the neural network output comprises respective occupancy outputs corresponding to a plurality of agent types at one or more future time points;
      the occupancy output for each agent type at a first future time point comprises respective occupancy probabilities for a plurality of cells, each cell corresponding to a respective one of a plurality of locations in the environment; and
      in the occupancy output for each agent type at the first future time point, the respective occupancy probability for each cell characterizes a likelihood that an agent of the agent type will occupy the corresponding location in the environment at the first future time point; and
   providing the neural network output as input to one or more systems located on-board the vehicle for use in controlling navigation of the vehicle.

17. The system of claim 16, wherein the one or more systems located on-board the vehicle comprise a planning system that plans navigation of a vehicle in the environment.

18. The system of claim 16, wherein the scene data comprises, for each agent type, respective locations of agents of the agent type in the environment at one or more previous time points.

19. One or more non-transitory storage media storing instructions that when executed by one or more computers cause the one or more computers to perform operations comprising:
   obtaining scene data characterizing a current scene in an environment being navigated through by a vehicle;
   processing a neural network input comprising the scene data using a neural network to generate a neural network output, wherein:
      the neural network output comprises respective occupancy outputs corresponding to a plurality of agent types at one or more future time points;
      the occupancy output for each agent type at a first future time point comprises respective occupancy probabilities for a plurality of cells, each cell corresponding to a respective one of a plurality of locations in the environment; and
      in the occupancy output for each agent type at the first future time point, the respective occupancy probability for each cell characterizes a likelihood that an agent of the agent type will occupy the corresponding location in the environment at the first future time point; and
   providing the neural network output as input to one or more systems located on-board the vehicle for use in controlling navigation of the vehicle.

20. The non-transitory storage media of claim 19, wherein the one or more systems located on board the vehicle comprise a planning system that plans navigation of a vehicle in the environment.

* * * * *